US008605695B1

United States Patent
Yucek et al.

(10) Patent No.: US 8,605,695 B1
(45) Date of Patent: *Dec. 10, 2013

(54) RADIO FREQUENCY SIGNAL ANALYSIS AND CLASSIFICATION USING TIME-FREQUENCY INFORMATION

(75) Inventors: Tevfik Yucek, Sunnyvale, CA (US); Paul Petrus, San Jose, CA (US); Sundar G. Sankaran, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 13/048,606

(22) Filed: Mar. 15, 2011

Related U.S. Application Data (63) Continuation of application No. 12/323,732, filed on Nov. 26, 2008, now Pat. No. 7,929,508.

(60) Provisional application No. 61/060,628, filed on Jun. 11, 2008.

(51) Int. Cl.
*H04W 4/00* (2009.01)

(52) U.S. Cl.
USPC .................. 370/338; 370/241; 455/161.3

(58) Field of Classification Search
None
See application file for complete search history.

(56) References Cited

U.S. PATENT DOCUMENTS

| | | | |
|---|---|---|---|
| 6,130,907 A * | 10/2000 | Chen | 370/342 |
| 6,697,013 B2 | 2/2004 | McFarland et al. | |
| 6,850,735 B2 * | 2/2005 | Sugar et al. | 455/67.11 |
| 6,891,496 B2 | 5/2005 | Husted et al. | |
| 6,954,171 B2 | 10/2005 | Husted et al. | |
| 7,129,884 B1 | 10/2006 | Tehrani et al. | |
| 7,525,942 B2 * | 4/2009 | Cordone | 370/335 |
| 7,643,811 B2 | 1/2010 | Reunamaki et al. | |
| 2003/0223354 A1 | 12/2003 | Olszewski | |
| 2005/0032479 A1 * | 2/2005 | Miller et al. | 455/67.11 |
| 2006/0159003 A1 | 7/2006 | Nanda et al. | |
| 2006/0178124 A1 * | 8/2006 | Sugar | 455/226.1 |
| 2007/0086396 A1 | 4/2007 | Alapuranen | |
| 2007/0254612 A1 | 11/2007 | Simmons et al. | |
| 2008/0267275 A1 | 10/2008 | Li et al. | |
| 2009/0047920 A1 | 2/2009 | Livsics et al. | |
| 2009/0111496 A1 | 4/2009 | Ibrahim et al. | |
| 2009/0285116 A1 | 11/2009 | Nanda et al. | |
| 2011/0090939 A1 * | 4/2011 | Diener et al. | 375/136 |

OTHER PUBLICATIONS

"AirMagnet Wireless Network Assurance", http://www.airmagnet.com/ (obtained Dec. 8, 2008).
"MetaGeek—Makers of the Wi-Spy Spectrum Analyzer", http://www.metageek.net/ (obtained Dec. 8, 2008).

(Continued)

*Primary Examiner* — Min Jung
(74) *Attorney, Agent, or Firm* — DeLizio Gilliam, PLLC (57) ABSTRACT

A signal analysis mechanism for processing and classifying an RF signal received at a WLAN device. A plurality of spectral data captures comprising time-frequency data and receive signal strength indicator (RSSI) data associated with the RF signal received at the WLAN device are generated. The time-frequency and RSSI data of each of the plurality of spectral data captures is processed to determine whether each spectral data capture is a narrowband signal capture. If the plurality of spectral data captures are narrowband signal captures, a narrowband interference signal type associated with the received RF signal is determined based, at least in part, on a plurality of parameters associated with the narrowband signal captures.

22 Claims, 6 Drawing Sheets

(56) References Cited

OTHER PUBLICATIONS

"Motorola Airdefense Solutions", http://www.airdefense.net/ (obtained Dec. 8, 2008).

"Oasis Spectrum Management", http://www.summitekinstruments.com/oasis/ (obtained Dec. 8, 2008).

"RF Solutions—Cisco Systems", http://www.cisco.com/en/US/netsol/ns736/networking_solutions_package.html (obtained Dec. 8, 2008).

* cited by examiner

RADIO FREQUENCY SIGNAL ANALYSIS AND CLASSIFICATION USING TIME-FREQUENCY INFORMATION

RELATED APPLICATION

This application is a continuation of U.S. application Ser. No. 12/323,732, filed Nov. 26, 2008, which claims the priority benefit of U.S. Provisional Application No. 61/060,628, filed Jun. 11, 2008.

BACKGROUND

Embodiments of the inventive subject matter generally relate to the field of wireless communication systems, and, more particularly, to techniques for processing and classifying radio frequency (RF) signals.

Wireless local area (WLAN) devices share the unlicensed frequency spectrum with various commercial devices, such as microwave ovens, cordless phones, baby monitors, and devices based on various other wireless standards, such as wireless USB, Zigbee®, Bluetooth® and HomeRF. The RF signals emitted by these devices act as interference to WLAN devices and therefore may impact the performance of the WLAN devices.

SUMMARY

Various embodiments are disclosed of an apparatus and method for processing and classifying an RF signal received at a WLAN device. In one embodiment, a plurality of spectral data captures comprising time-frequency data and receive signal strength indicator (RSSI) data associated with the RF signal received at the WLAN device are generated. The time-frequency and RSSI data of each of the plurality of spectral data captures is processed to determine whether each spectral data capture is a narrowband signal capture. If the plurality of spectral data captures are narrowband signal captures, a narrowband signal type associated with the received RF signal is determined based, at least in part, on a plurality of parameters associated with the narrowband signal captures.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In various embodiments, a signal analysis mechanism detects and classifies RF signals that interfere with WLAN devices using their temporal and frequency characteristics. The temporal and frequency characteristics are obtained from the RF signal observed at the antenna of the WLAN device. In one implementation, the signal extraction is achieved by collecting spectral scan data (e.g., time-frequency data) produced by a spectral scan unit (e.g., an FFT engine) on the receiver of the WLAN device. A signal classification unit processes the spectral scan data to identify the interference signal and analyzes other signal parameters to classify the interference signal as a certain interference signal type, as will be further described below.

Figure 1:
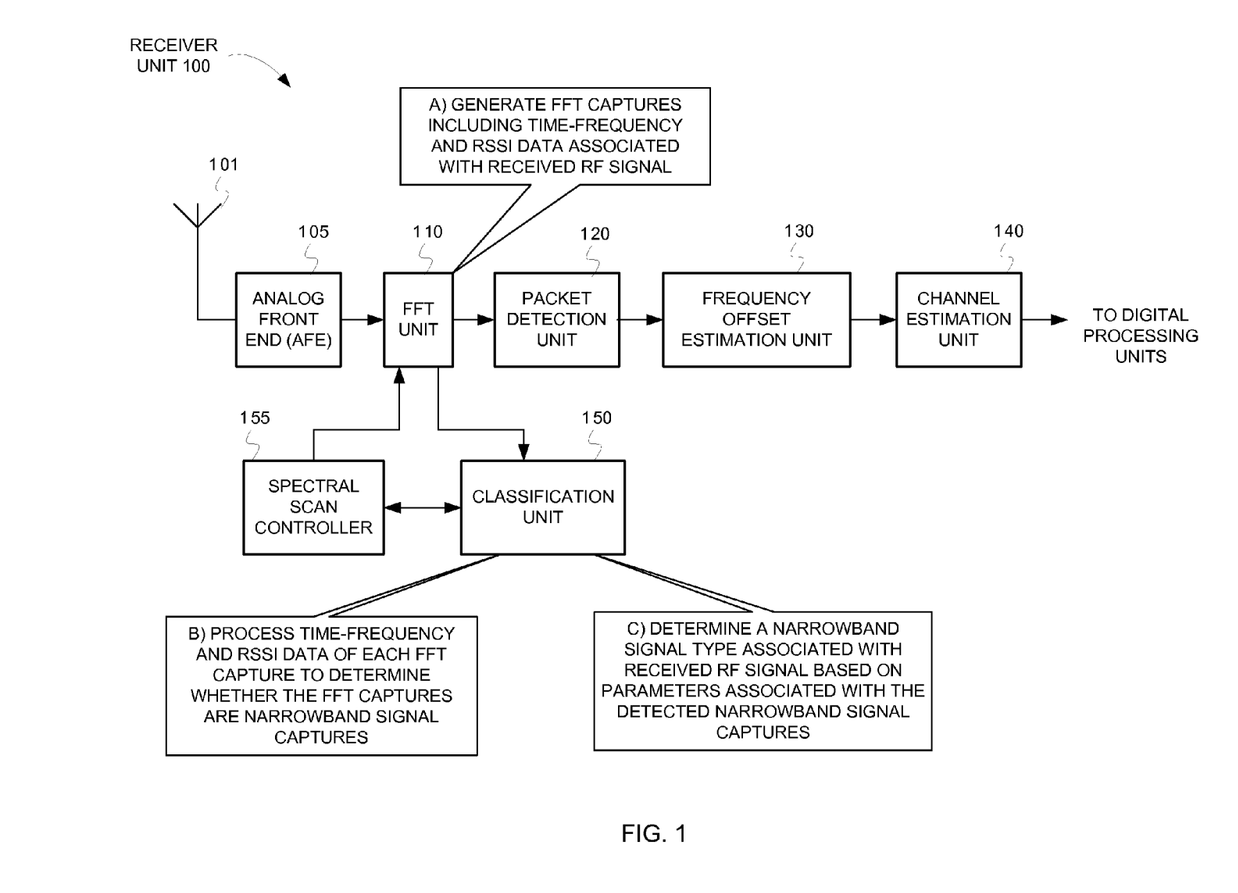
FIG. 1 is an example block diagram of a receiver unit of a WLAN device configured to determine whether received RF signals are interference signals and determine the type of interference signals.
Figure 4:
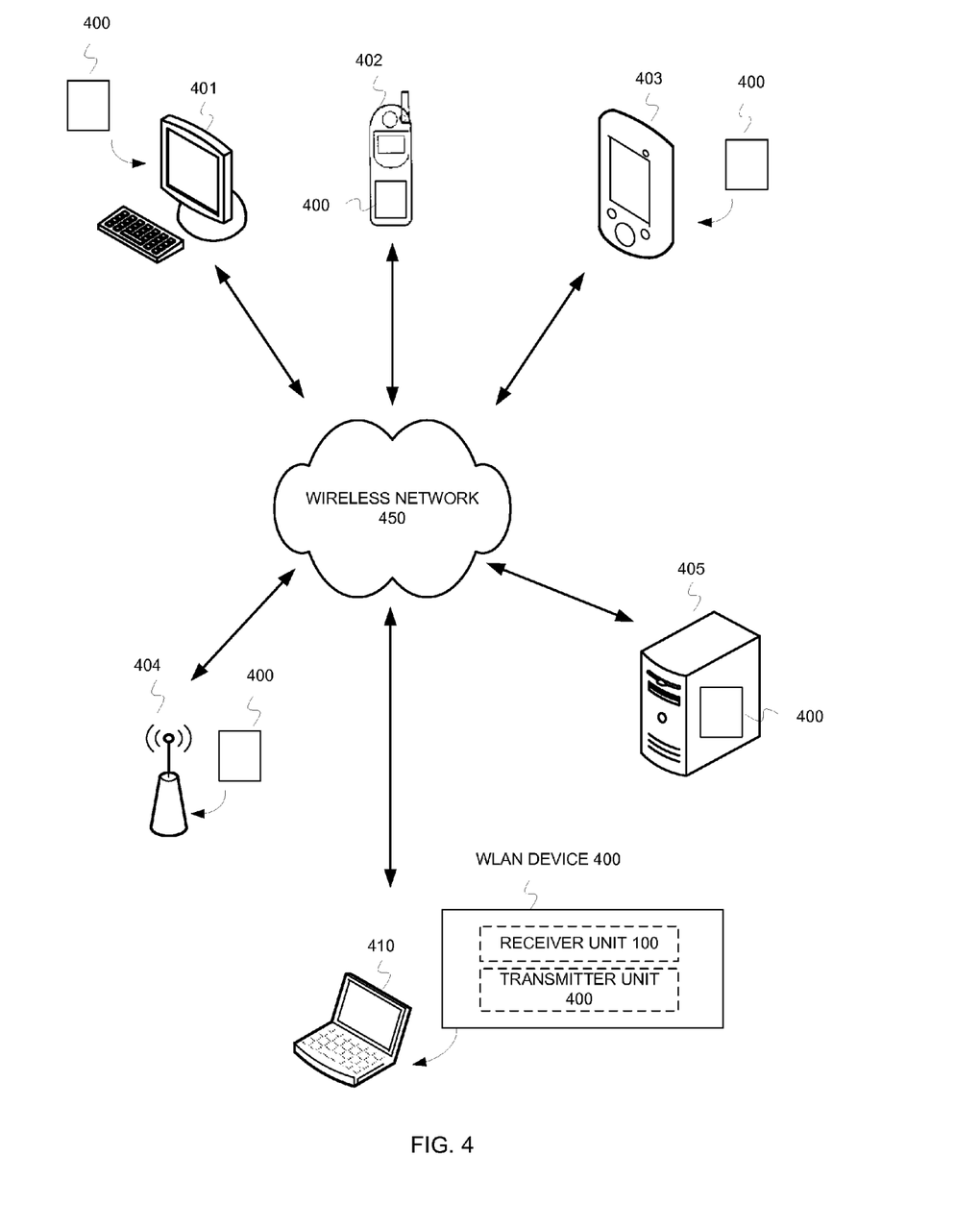
FIG. 4 is a conceptual diagram of an example wireless communication system.

FIG. 1 is an example block diagram of a receiver unit 100 configured to determine whether received RF signals are interference signals and determine the type of interference signals. The receiver unit 100 may be implemented in a transceiver of a WLAN device (e.g., as illustrated in FIG. 4). In various implementations, the receiver unit 100 includes an antenna 101, an analog front end (AFE) 105, a Fast Fourier Transform (FFT) unit 110, a packet detection unit 120, a frequency offset estimation unit 130, a channel estimation unit 140, a signal classification unit 150, and a spectral scan controller 155.

During operation, the antenna 101 can receive RF signals and provide the received RF signals to the analog front end 105. The analog front end 105 can include 1) one or more amplifying stages to amplify the received RF signal, 2) one or more filtering stages to remove unwanted bands of frequencies, 3) mixer stages to down-convert the received RF signal, 4) an automatic gain control (AGC) unit to adjust the gain to an appropriate level for a range of received signal amplitude levels, 5) an analog to digital converter (ADC) to convert the received RF signal into a digital signal, etc. The FFT unit 110 generates FFT data, e.g., time-frequency data associated with the digital representation of the received RF signal. When the WLAN device of the receiver unit 100 is performing WLAN operations (i.e., processing WLAN traffic), the FFT unit 110 provides the FFT data to the packet detection unit 120. The packet detection unit 120 may use information in the received signal's preamble to detect an incoming packet. For example, the packet detection unit 120 can perform self-correlation on the received signal, use a combination of cross correlation (with a known STF symbol) and self-correlation, or use any suitable method to detect the packet.

The frequency offset estimation unit 130 can use the short training fields (STFs) and/or the long training fields (LTFs) to estimate a carrier frequency offset in the received RF signal. The carrier frequency offset in the received RF signal may then be corrected using the carrier frequency offset estimate. The carrier frequency offset may be caused by improper synchronization between the crystal frequency generator on the receiver and transmitter. The channel estimation unit 140 can use the LTFs to determine channel estimates (e.g., estimate channel coefficients and channel response). The channel estimates may be determined to counter the effect of the communication channel on information symbols in the received RF signal. Channel estimates describe the effect (attenuation, distortion, etc.) of the communication channel on signals that pass through it. From the channel estimation unit 140, other digital processing units can use the channel estimates, further process the received symbols, and retrieve one or more information symbols. In one embodiment, subsequent digital processing blocks can include a demodulator, a deinterleaver, a decoder, and other digital components depending on the encoding applied before transmission.

In various implementations, when the WLAN device of the receiver unit 100 is not processing WLAN traffic (i.e., transmitting or receiving WLAN signals), the receiver unit 100 may initiate spectral scan operations to process a received RF signal and determine whether the RF signal is an interference signal and the type of interference signal. The FFT unit 110 generates a plurality of FFT captures comprising time-frequency data and receive signal strength indicator (RSSI) data associated with the received RF signal and provides the FFT captures to the classification unit 150, as noted in stage A. The classification unit 150 processes the time-frequency and RSSI data of each of the FFT captures to determine whether each FFT capture is a narrowband signal capture, as noted in stage B. If the FFT captures are narrowband signal captures, at stage C, the classification unit 150 determines a narrowband signal type associated with the received RF signal based, at least in part, on a plurality of parameters associated with the narrowband signal captures, as will be further described below with reference to FIG. 2. In one example, duration, burst width, and frequency parameters of narrowband signal components may be used to classify the received narrowband signals. For instance, the received narrowband signals may be classified as Bluetooth® signals, microwave oven leakage signals, frequency-hopping spread-spectrum (FHSS) cordless phones, baby monitors, etc. In some implementations, the classification unit 150 may also determine whether the received RF signals are wideband signals and identify the wideband signal type (e.g., WLAN signals, direct-sequence spread-spectrum (DSSS) cordless phones, etc.). After determining the type of RF interference signal, the classification unit 150 provides the RF signal type classification information to the spectral scan controller 155 for analysis and to determine whether to take any corrective action (e.g., switch frequency channels on the WLAN device).

In one embodiment, the spectral scan controller 155 enables and disables the FFT spectral scan operations for signal analysis. The spectral scan controller 155 may be implemented as an intrusive, high priority task. In this example, the spectral scan operations may have higher priority than data traffic and therefore the data traffic may be suspended until the spectral scan operations have been completed. In another example, the FFT spectral scan operations can be implemented as a background process for non-intrusive operation. In this example, the spectral scan operations are low priority compared to data traffic and therefore the spectral scan operations co-exist with the data traffic. It is noted, however, that in some implementations the FFT spectral scan operations may be implemented as low priority operations in some cases and high priority operations in other cases.

In some embodiments, the FFT unit 110 may be implemented in hardware and the classification unit 150 and spectral scan controller 155 may be implemented in software. It is noted, however, that each of the components of the receiver unit 110 (e.g., the FFT unit 110, the classification unit 150, etc.) may be implemented in software and/or hardware.

It should be noted that the components described with reference to FIG. 1 are meant to be exemplary only, and are not intended to limit the inventive subject matter to any specific set of components or configurations. For example, in various embodiments, one or more of the components described may be omitted, combined, modified, or additional components included, as desired. For instance, in some embodiments, the spectral scan operations for analysis and classification of RF signals described herein may be implemented within various other types of wireless devices.

Figure 2:
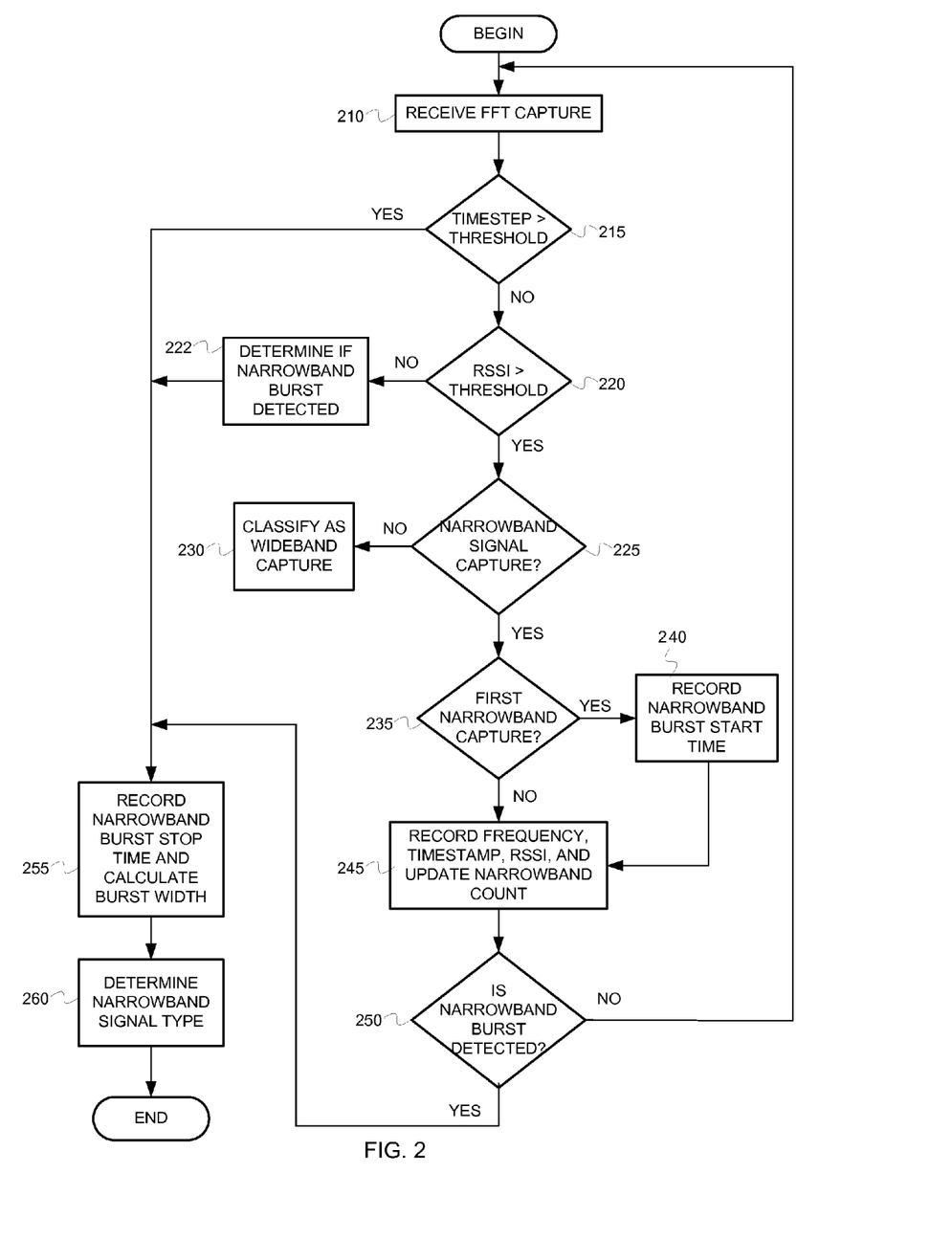
FIG. 2 is an example flow diagram of a method for processing and classifying narrowband interference signals in a WLAN device.

FIG. 2 is an example flow diagram of a method for processing and classifying narrowband interference signals in a WLAN device. The narrowband signal detection algorithm uses the bursty nature of narrowband signals to identify the signals, and uses the properties of the narrowband bursts to classify each of the signals as a certain narrowband signal type. At block 210, an FFT capture associated with an RF signal acquired by the receiver unit 100 is received at the classification unit 150 from the FFT unit 110. The FFT capture includes time-frequency data and RSSI data associated with the received RF signal. The FFT unit 110 may provide various FFT captures associated with the received RF signal to the classification unit 150 in order to classify the received RF signal. From block 210, the flow continues at block 215.

At block 215, it is determined whether a timestep is greater than a predetermined timestep threshold. The timestep can be defined as the time difference between the previous FFT capture and the current FFT capture. In one example, the classification unit 150 may calculate the timestep and determine whether the timestep is greater than the predetermined timestep threshold. The timestep may help detect when a significant amount of time elapses between FFT captures. For example, if the WLAN device begins to process WLAN traffic, the FFT signal analysis operations may be interrupted for a considerable amount of time. If the classification unit 150 detects that too much time elapsed between the current FFT capture and the previous FFT capture, i.e., if the timestep is greater than the predetermine timestep threshold, the FFT captures for the current narrowband burst analysis are stopped and the flow continues at block 255, where the width of the current narrowband burst is calculated. In some examples, before analyzing the timestep, the classification unit 150 may first determine whether the current FFT capture is the first detected FFT capture. For example, the classification unit 150 may read a counter that keeps track of the number of FFT captures that have been received during the current signal analysis operation. If the current FFT capture is the first detected FFT capture, the classification unit 150 may skip the timestep calculations of block 215 and the flow continues to block 220. Also, if the timestep is less than the predetermine timestep threshold, the flow continues to block 220.

At block 220, it is determined whether the RSSI data included in the received FFT capture is greater than a predetermined RSSI threshold. In one example, the classification unit 150 determines whether the RSSI data is greater than the predetermined RSSI threshold. From block 220, if the RSSI data is greater the predetermined RSSI threshold, the flow continues to block 225. If the RSSI is less than the predetermined RSSI threshold, the flow continues to block 222.

Figure 3:
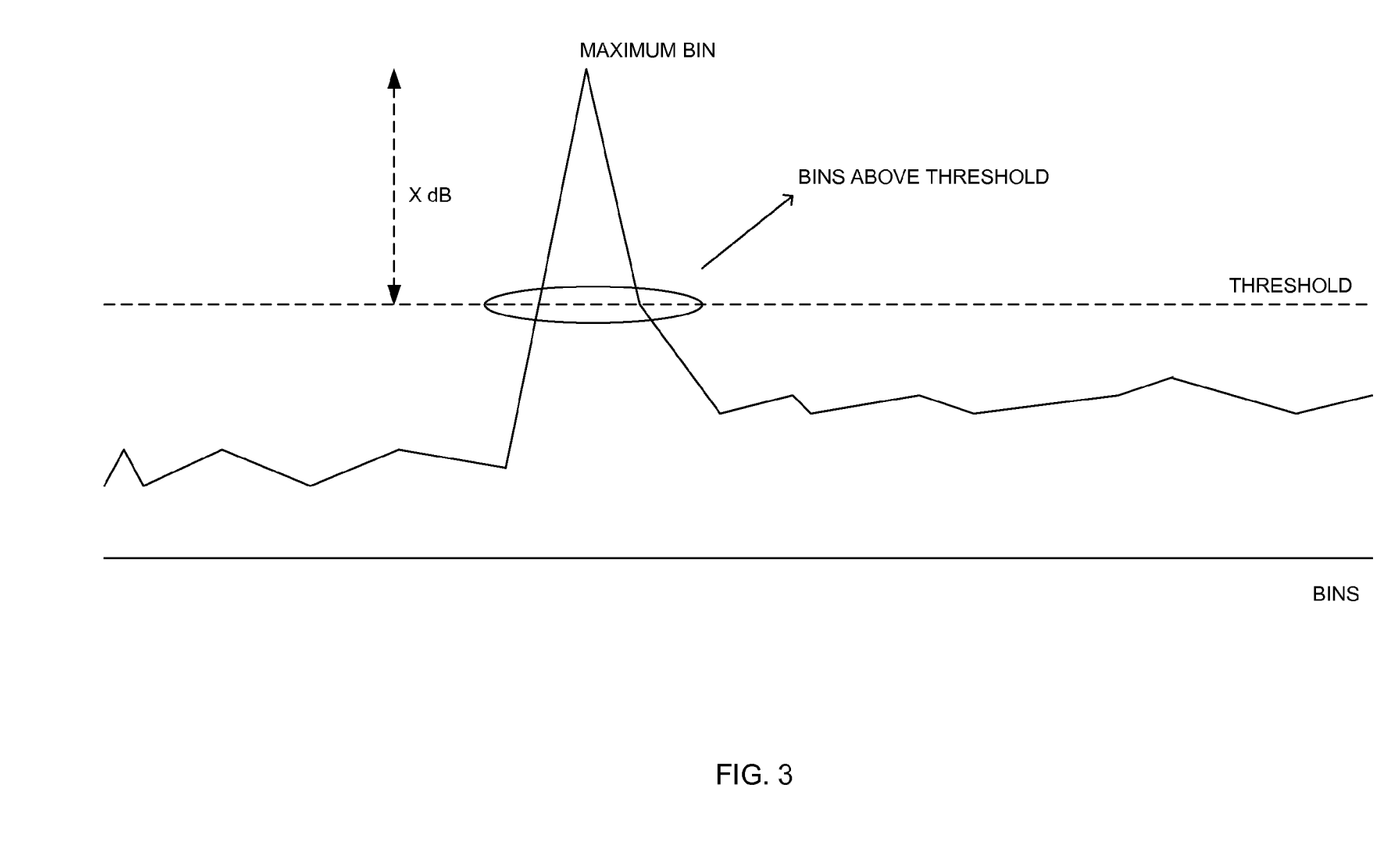
FIG. 3 is a diagram illustrating a technique for determining whether an FFT capture is a narrowband FFT capture.

At block 225, if the RSSI data is greater the predetermined RSSI threshold, it is determined whether the FFT capture associated with the received RF signal is a narrowband signal capture. For example, the classification unit 150 determines whether the received FFT capture is a narrowband signal capture or a wideband signal capture. As noted above, the received FFT capture comprises spectral data including a plurality of FFT frequency bins. In one implementation, the classification unit 150 counts the number of frequency bins (i.e., the bin count) associated with the received FFT capture that are above a predetermined decibel threshold. As illustrated in FIG. 3, the predetermined decibel threshold may be selected to be X decibels below a maximum decibel value (i.e., peak) of the FFT capture. For example, if the maximum decibel value or peak of the received FFT capture is at 10 dB and X is equal to 4 dB, then the threshold is set at 6 dB. The classification unit 150 then compares the bin count to a predetermined bin count threshold to determine whether the received FFT capture is narrowband or wideband.

If the bin count is greater than or equal to the predetermined bin count threshold, then the received FFT capture is classified as a wideband signal capture. If the bin count is less than the predetermined bin count threshold, then the received FFT capture is classified as a narrowband signal capture. From block 225, if the received FFT capture is classified as a wideband signal capture, the flow continues to block 230. At block 230, the classification unit 150 provides an indication to the spectral scan controller 155 that the received FFT capture was a wideband signal capture. If the received FFT capture is classified as a narrowband signal capture, the flow continues to block 235.

At block 235, it is determined whether the received FFT capture is the first narrowband FFT capture that has been received during a signal analysis operation. For example, the classification unit 150 may read a counter that keeps track of the number of narrowband FFT captures that have been received (i.e., the narrowband capture count) during the signal analysis operation associated with a narrowband burst. If the counter has a value of zero, then the received FFT capture is the first FFT capture, and the flow continues to block 240. If the counter has a value other than zero, then the received FFT capture is not the first FFT capture, and the flow continues to block 245.

At block 240, if the received FFT capture is the first FFT capture, a start time of the current narrowband burst is recorded. For example, the classification unit 150 may record the start time of the current narrowband burst in a register or memory. The start time will be used, along with a subsequently recorded stop time, to determine the width of the current narrowband burst. After recording the start time, or if it is determined that the received FFT capture is not the first FFT capture, the flow continues to block 245.

At block 245, the narrowband capture count is incremented, a timestamp associated with the received FFT capture is stored, and the RSSI and frequency associated with the received FFT capture is recorded. For example, the classification unit 150 may update the counter keeping track of the narrowband capture count, and record the timestamp, the RSSI and frequency associated with the received FFT capture. The narrowband capture count and the timestamp may help determine when a narrowband burst has been detected. From block 245, the flow continues to block 250.

At block 250, it is determined whether a narrowband burst has been detected. In one implementation, the classification unit 150 may read the narrowband capture count to determine whether a certain number of consecutive narrowband captures have been received. Additionally, the classification unit 150 may calculate the duration between the first and last received narrowband captures and determine whether the duration is greater than a predetermined duration threshold. In this implementation, a narrowband burst is considered detected when the narrowband capture count is above a predetermined count threshold and when the duration is above the predetermined duration threshold. In one example, the duration between the first and last received narrowband captures may be calculated by finding the difference between the timestamp of the last received narrowband capture and the timestamp of the first received narrowband capture. If a narrowband burst is detected, the flow continues to block 255. If a narrowband burst is not detected, the flow loops to block 205, where the classification unit 150 receives a subsequent FFT capture.

Similarly, at block 222, if the RSSI data is less than the predetermined threshold (block 220), it is determined whether a narrowband burst has been detected. For example, the classification unit may determine whether a narrowband burst has been detected using a similar process as described above with reference to block 250. In this example, the classification unit 150 may use the timestamp from the previous narrowband capture to calculate the duration of the burst and determine whether the duration is greater than the predetermined threshold. Also, the classification unit 150 may determine whether the narrowband capture count (which at this point has been updated to account for the previous narrowband capture) is greater than the count threshold. If a narrowband burst is not detected, then the flow ends. If a narrowband burst is detected, the flow continues to block 255.

At block 255, a stop time of the current narrowband burst is recorded and the width of the current narrowband burst is calculated. For example, the classification unit 150 records the stop time of the current narrowband burst, and determines the width of the current narrowband burst by finding the difference between the recorded stop time and the recorded start time of the current narrowband burst. In some implementations, besides the start time, the stop time, and the width of the detected narrowband burst, the classification unit 150 may also calculate the average frequency of the FFT bins with maximum power associated with the narrowband FFT captures of the detected narrowband burst. In addition, the classification unit 150 may calculate an average RSSI value from the recorded RSSI data of the narrowband FFT captures. Furthermore, the classification unit 150 may calculate a spread of maximum bin index based on the frequency difference between the narrowband FFT capture whose maximum bin value is at the lowest frequency and the narrowband FFT capture whose maximum bin value is at the highest frequency for the detected narrowband burst. In some implementations, the classification unit 150 may use this information, in addition to the narrowband capture count and duration information, to further certify that the detected burst is a narrowband burst. For instance, in one implementation, to further certify that the detected burst is a narrowband burst, it is determined whether the maximum bin values in the narrowband FFT captures of the detected burst have small variations, which confirms that the narrowband FFT captures in the detected burst contain data with the same or similar frequencies. From block 255, the flow continues to block 260.

At block 260, it is determined whether enough data has been collected to classify the received RF signal associated with the detected narrowband burst as a certain type of narrowband signal. In some implementations, the received RF signal is classified when the classification unit 150 detects a predetermined number of narrowband bursts and analyzes a plurality of parameters associated with the detected narrowband bursts. For instance, in one example, the received RF signal is classified when the classification unit 150 detects at least two or three narrowband bursts and analyzes a plurality of parameters associated with the detected narrowband bursts (e.g., burst width, frequency, etc.). In this example, if the detected narrowband burst is the first detected narrowband burst, then classification unit 150 continues to acquire and analyze FFT captures (i.e., process loops to block 205) to detect at least one additional narrowband burst before moving forward with the classification operation.

In some implementations, the received RF signal is classified when the classification unit 150 detects and analyzes a predetermined number of narrowband bursts within a predetermined observation time window. In these implementations, if the classification unit 150 does not detected the predetermined number of narrowband bursts within the predetermined observation time window, the signal analysis operation restarts. The classification unit 150 may classify the narrowband burst as a Bluetooth® signal, microwave oven leakage signal, frequency-hopping spread-spectrum (FHSS) cordless phone signal, a baby monitor signal, etc., according to the classification criteria described below. From block 260, the flow ends. It is noted that in other implementations the classification unit 150 may perform the classification operation after detection of any suitable number of narrowband bursts. Furthermore, it is noted that in some implementations the classification unit 150 may implement different observation time windows and/or require a different number of detected narrowband bursts for classifying different narrowband signal types (e.g., different requirements for Bluetooth® signal than for microwave oven leakage signal).

Examples of classification criteria that may be implemented by the classification unit 150 for various types of narrowband signals when analyzing the parameters of the detected narrowband bursts are as follows:

Microwave Oven Leakage Signals
  Two consecutive bursts with length above 4 ms are observed;
  Both burst are at the same frequency; and
  The bursts have a gap of minimum 15 ms and maximum 60 ms in between.
Alternatively:
  Three consecutive bursts at the same frequency are observed;
  The last burst's width is larger than 500 µs; and
  The bursts are separated by at least 8 ms.
FHSS Cordless Phone Signals
  The burst width is less than the slot duration of 1.25 ms;
  The burst width is larger than the minimum burst width threshold;
  The time-gap between the last two consecutive bursts is within the range of 5 ms;
  The frequencies of the last two consecutive bursts are the same; and
  The third-to-last burst is at a different frequency than the last two consecutive bursts.
Bluetooth® (A2DP) Signals
  The burst width is above a Bluetooth® threshold and smaller than a microwave threshold;
  The last two bursts are at most 9.5 ms apart;
  The last two bursts are at the same frequency; and
  The third-to-last burst is at a different frequency than the last two bursts.
Bluetooth® (Hands-Free) Signals
  The last two bursts are at the same frequency;
  The third-to-last burst is at a different frequency than the last two bursts;
  The last two bursts are at most 1 ms apart;
  The last two bursts are at most 600 µs; and
  The third burst is at least 3.5 ms away from the second burst.
Continuous Tone Signals
  The last four bursts have frequency spread of zero, i.e., tone shows up at the same FFT bin;
  The last four bursts show up at the same frequency; and
  The last burst lasts more than 800 µs.

Active Video Bridge Signals
  The last burst is larger than 500 µs;
  The gaps between bursts are smaller than 500 µs; and
  The last three bursts are at most 4 MHz apart.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, in the description of FIG. 2, the various thresholds considered during the FFT capture phase of the process and the classification criteria considered during the classification phase of the process may be programmable. In one specific example, the amount of time a signal is observed may be varied using the observation time window and/or the required minimum number of detected narrowband bursts may be varied to help prevent false detections. Additionally, in some embodiments, a wideband detection classification technique based on the extraction and analysis of wideband bursts (block 230) may be implemented, which may be similar to the narrowband technique described above. Furthermore, it is noted that in some embodiments the spectral scan data can be generated by other techniques besides FFT to perform the spectral analysis and classification operations.

In various implementations, after classification of a received RF signal as a certain narrowband (or wideband) signal type, the classification unit 150 provides the classification information to the spectral scan controller 155. The spectral scan controller 155 analyses the classification information associated with the detected interference signal and determines what action to take in view of the interference. In one implementation, the spectral scan controller may change the operational frequency of the WLAN device in order to avoid performance loss. For example, the spectral scan controller may implement a channel selection algorithm that can use the total energy of the interference in a given frequency channel and/or the type of the interference and the frequency occupancy pattern of the interference to change the channel of the WLAN device to avoid the interference.

In some cases, the spectral scan controller 155 may alert the user of the wireless system comprising the WLAN device and suggest methods to prevent or avoid the interference. For example, if a microwave oven leakage signal is detected, the spectral scan controller 155 may suggest that the user turn off the microwave oven. In some examples the spectral scan controller 155 may cause the spectral information and identified sources of interference to be displayed to the user via a graphical user interface (GUI). For example, as the user is operating a laptop computer comprising the WLAN device, the user may be presented with a pop-up window providing the user with the interference information and a suggested course of action.

In some implementations, the spectral scan controller 155 may adjust the coding rate, modulation packet length, and/or transmission power based on the detected interference. For example, if the detected interference is periodic, the timing of when data is transmitted and received by the WLAN device can be adjusted to coincide with the times when the interference is not present. In this example, a modulation scheme and transfer rate can be used so that the data packets are kept relatively short to avoid the times when the interference is present.

In one embodiment, the spectral scan controller 155 enables and disables the FFT spectral scan operations for signal analysis. For example, the spectral scan controller 155 may provide an enable/disable signal to the FFT unit 110 to control when the FFT unit 110 provides the time-frequency information and RSSI data to the classification unit 150. In some embodiments, the FFT spectral scan operations for signal analysis may be implemented (e.g., in the receiver unit 110 of a WLAN device) in at least two ways. In one example, the FFT spectral scan operations can be implemented as an intrusive, high priority task. In this example, the spectral scan operations may have higher priority than data traffic and therefore the data traffic may be suspended until the spectral scan operations have been completed. In another example, the FFT spectral scan operations can be implemented as a background process for non-intrusive operation. In this example, the spectral scan operations are low priority compared to data traffic and therefore the spectral scan operations co-exist with the data traffic. It is noted, however, that in some implementations the FFT spectral scan operations may be implemented as a low priority operation in some cases and a high priority operation in other cases. For example, the default may be a low priority implementation, however, if certain interference is initially detected and/or if performance is being significantly affected, the spectral scan operations may be changed to high priority operations.

The FFT spectral scan operations can be initiated by a user or by a network administrator. The WLAN device can also automatically initiate spectral scan operations in a communication device (e.g., laptop or access point) based on whether a bit error rate (BER or a packet error rate (PER) is above a certain threshold and/or if there is a sudden increase in the BER/PER. As noted above, for the automatic mode, the spectral scan operations may be implemented as a low priority operation, high priority operation, or a combination of the two (i.e., low priority in some instances and high priority in other instances).

FIG. 4 is a conceptual diagram of an example wireless communication system. As illustrated, the communication system may include a plurality of communication devices, such as a personal computer (PC) 401, mobile phone 402, a global positioning system (GPS) device 403, a WLAN access point 404, a server 405 (e.g., accessible via the Internet), and a laptop 410, transmitting and receiving information via a wireless communication network 450. In various implementations, the communication devices comprise a WLAN device 400 including a receiver unit (e.g., the receiver unit 100 of FIG. 1) operable to receive WLAN signals and a transmitter unit 420 operable to transmit WLAN signals. The receiver unit 100 is further operable to implement some or all of the operations and features described above with reference to FIGS. 1-3. For example, the WLAN access point 404 and laptop 410 utilize the receiver unit 100 to implement the FFT spectral scan operations described above in FIGS. 1-3 for processing and classifying received RF interference signals, and implementing steps to reduce or eliminate the interference.

In some implementations, if a client device, e.g., the laptop 410, in the communication system detects and classifies an RF interference signal, the client device may provide the interference type information to one or more access points in the network, e.g., access point 404. The interference environment seen at an access point can be different from that of the client device. Therefore, the interference information may be exchanged from a client device to an access point so that the access point can understand the interference seen at the client device and utilize this information to make intelligent choices during operation, e.g., when selecting transmission channels. It is noted that in some implementations the access points may also provide detected interference information to client devices for similar reasons.

Figure 5:
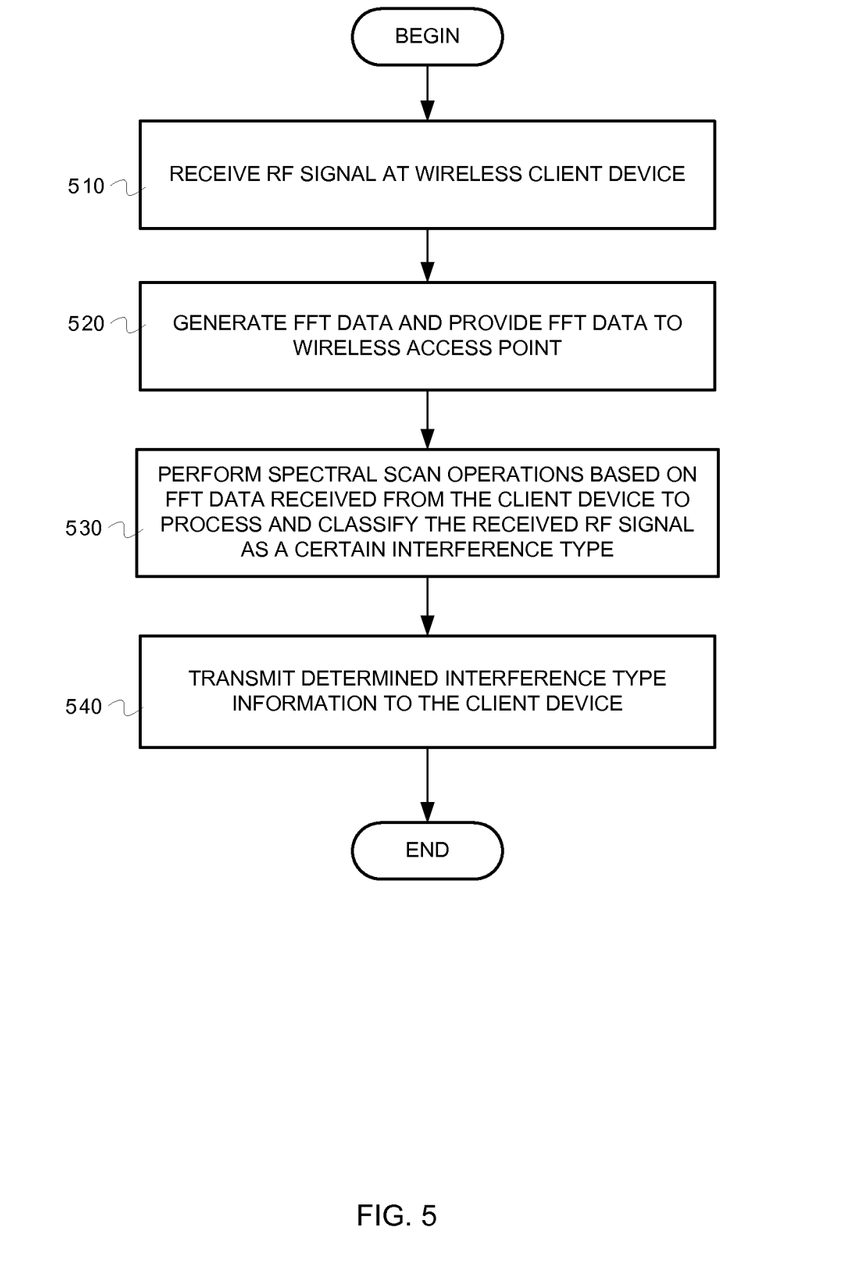
FIG. 5 is an example flow diagram of a method for processing and classifying narrowband interference signals in a wireless communication system.

FIG. 5 is an example flow diagram of a method for processing and classifying narrowband interference signals in a wireless communication system. In some embodiments, the client devices of the wireless communication system (e.g., mobile phone 402, laptop 410, etc. shown in FIG. 4) may not have the capability (e.g., the analysis software) to perform the FFT spectral scan operations described above with reference to FIGS. 1-3 for analysis and classification of RF interference signals. In these implementations, when the client device (e.g., laptop 410) receives an RF signal (block 510), the client device generates FFT data (e.g., time-frequency data and RSSI data) associated with the received RF signal and transmits the FFT data to an access point (e.g., access point 404) via the wireless network 450 (block 520). The access point performs spectral scan operations based on the FFT data received from the client device to process and classify the RF signal as a certain interference type, e.g., using the technique described above with reference to FIGS. 1-3 (block 530). The access point then transmits the determined interference type information to the client device via the network 450 (block 540). In some examples, the access point may also recommend a course of action to the client device for reducing or eliminating the interference. In other examples, the client device may have the capability to determine one or more options for reducing or eliminating the interference based on the received interference type information.

In some implementations, each access point (e.g., access point 404) in a wireless communication system may transmit FFT data (e.g., time-frequency data and RSSI data) generated at the access point and/or FFT data collected from various client devices in the network to a central server (e.g., server 405). The central server performs signal classification based on the received FFT data. Furthermore, the central server may perform channel selection (e.g., provided a recommended list of channels to the access points and the client devices) and make other decisions based on the classification results and the collective information received from the various access points. It is noted that in some implementations the client devices can provide the access point a compressed version of information such as whether the capture was narrowband/wideband and what is the index for peak power.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
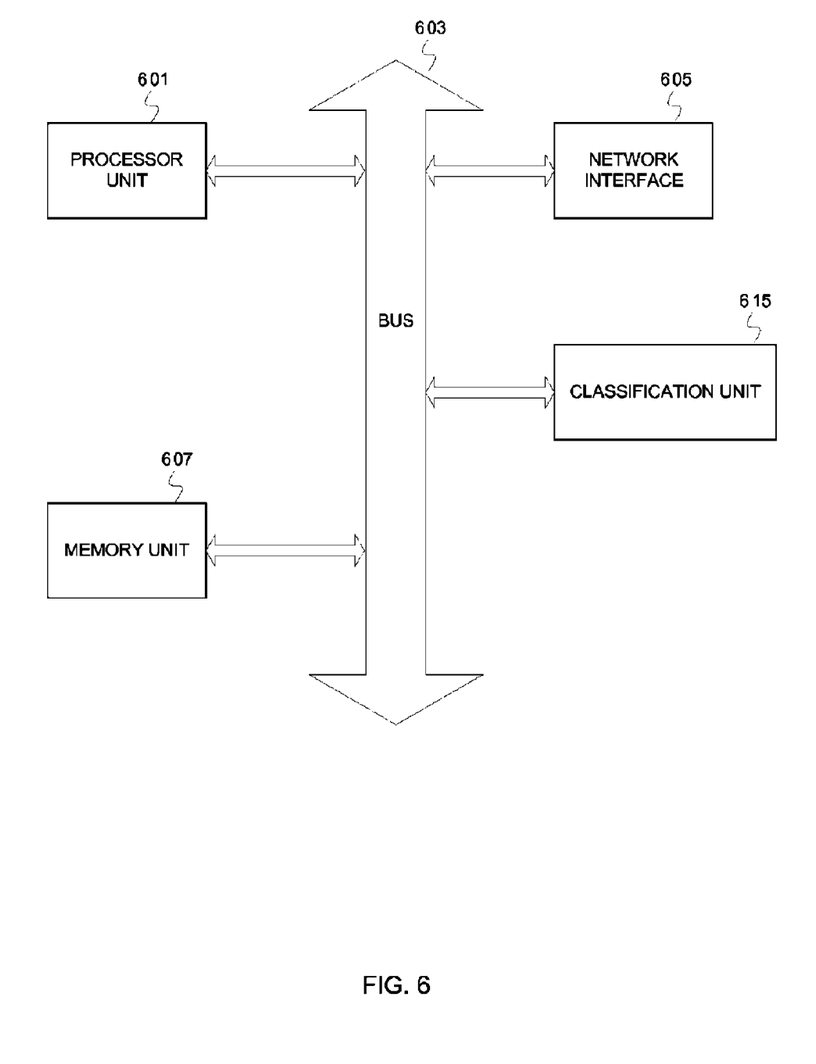
FIG. 6 is an example block diagram of a wireless device.

FIG. 6 is an example block diagram of a wireless device. In one implementation, the wireless device may be a WLAN device (e.g., the WLAN device 400 of FIG. 4). The WLAN device includes a processor unit 601 (possibly including multiple processors, multiple cores, multiple nodes, and/or implementing multi-threading, etc.). The WLAN device includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device also includes a bus 603 (e.g., PCI, ISA, PCI-Express, HyperTransport®, InfiniBand®, NuBus, etc.), and network interfaces 605 that include at least one wireless network interface (e.g., a WLAN interface, a Bluetooth® interface, a WiMAX interface, a ZigBee® interface, a Wireless USB interface, etc.). The WLAN device also includes a classification unit 615 that implements the functionalities described above with reference to FIGS. 1-5. Any one of the above described functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., additional network interfaces, peripheral devices, etc.). The processor unit 601 and the network interfaces 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, the RF signal detection and classification techniques as described herein may be implemented with facilities consistent with any hardware system or systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A wireless network device comprising:
a spectral scan unit operable to generate a plurality of spectral data captures comprising time-frequency data and receive signal strength indicator (RSSI) data associated with an RF signal received at the wireless network device; and
a classification unit operable to process the time-frequency data and RSSI data of each of the plurality of spectral data captures to determine whether each spectral data capture is a narrowband spectral data capture;
wherein, in response to the classification unit determining that the plurality of spectral data captures are narrowband spectral data captures, the classification unit is operable to:
for at least a subset of the plurality of narrowband spectral data captures, determine whether a narrowband spectral data capture is a first narrowband spectral data capture in a sequence of narrowband spectral data captures;
in response to determining that the narrowband spectral data capture is the first narrowband spectral data capture, determine a narrowband burst start time associated with the first narrowband spectral data capture; and
determine a narrowband signal type associated with the received RF signal based, at least in part, on the narrowband burst start time and a plurality of parameters associated with the narrowband spectral data captures.

2. The wireless network device of claim 1, wherein:
for each spectral data capture, the classification unit is operable to determine whether the RSSI data associated with the spectral data capture is greater than a predetermined RSSI threshold; and
in response to determining that the RSSI data is greater than the predetermined RSSI threshold, the classification unit is operable to process the time-frequency data associated with the spectral data capture.

3. The wireless network device of claim 1, wherein, for each spectral data capture, the time-frequency data comprises a plurality of frequency bins associated with the spectral data capture, wherein the classification unit is operable to:
determine a bin count of the plurality of frequency bins associated with the spectral data capture that are greater than a predetermined decibel threshold;
compare the bin count of the frequency bins that are greater than the predetermined decibel threshold to a predetermined bin count threshold to determine whether the spectral data capture is a narrowband spectral data capture;
in response to determining that the bin count is less than the predetermined bin count threshold, classify the spectral data capture as a narrowband spectral data capture; and
in response to determining that the bin count is greater than the predetermined bin count threshold, classify the spectral data capture as a wideband spectral data capture.

4. The wireless network device of claim 1, wherein, in response to determining that the narrowband spectral data capture is not the first narrowband spectral data capture in the sequence of narrowband spectral data captures, the classification unit is operable to:
   determine a number of consecutive narrowband spectral data captures and a duration between the first narrowband spectral data capture and a last narrowband spectral data capture associated with the sequence of narrowband spectral data captures; and
   in response to determining that the number of consecutive narrowband spectral data captures is greater than a predetermined count threshold and that the duration between the first narrowband spectral data capture and the last narrowband spectral data capture is greater than a predetermined duration threshold, determine that a narrowband burst associated with the sequence of narrowband spectral data captures has been detected.

5. The wireless network device of claim 4, wherein, in response to determining that the narrowband burst associated with the sequence of narrowband spectral data captures has been detected, the classification unit is operable to determine a narrowband burst stop time, and calculate a narrowband burst width based on a difference between the narrowband burst stop time and narrowband burst start time.

6. The wireless network device of claim 5, wherein the classification unit is further operable to classify the received RF signal as a certain type of narrowband signal based, at least in part, on a plurality of parameters associated with the detected narrowband burst and one or more additional detected narrowband bursts associated with the received RF signal.

7. The wireless network device of claim 1, wherein the spectral scan unit operable to generate the plurality of spectral data captures comprising time-frequency data and RSSI data associated with the received RF signal comprises a Fast Fourier Transform (FFT) unit operable to generate a plurality of FFT captures comprising time-frequency data and RSSI data associated with the received RF signal.

8. The wireless network device of claim 1, wherein the wireless network device comprises a wireless local area network (WLAN) client device or a WLAN access point.

9. The wireless network device of claim 1, further comprising:
   one or more signal processing units operable to process WLAN traffic;
   wherein, in a first mode of operation of the wireless network device, the spectral scan unit is operable to provide spectral data captures associated with one or more received RF signals to the signal processing units to decode the one or more received RF signals for WLAN traffic; and
   wherein, in the second mode of operation of the wireless network device, the spectral scan unit is operable to provide spectral data captures associated with one or more received RF signals to the classification unit for performing spectral analysis and classification operations on the one or more received RF signals.

10. The wireless network device of claim 1, further comprising a spectral scan controller, wherein in response to identifying an interference signal by classifying a received RF signal as a narrowband signal type, the classification unit is operable to provide classification information about the interference signal to the spectral scan controller, wherein in response to receiving the classification information the spectral scan controller is operable to change an operational frequency of the wireless network device to avoid the interference signal.

11. The wireless network device of claim 1, wherein the classification unit is further operable to:
   in response to determining that the bin count is equal to the predetermined bin count threshold, classify the spectral data capture as a narrowband spectral data capture.

12. A server system comprising:
   a classification unit operable to receive a plurality of Fast Fourier Transform (FFT) captures from a wireless network device via a communication network, wherein the plurality of FFT captures comprise time-frequency data and receive signal strength indicator (RSSI) data associated with an RF signal received at the wireless network device;
   wherein, for each FFT capture, the classification unit is operable to:
      determine a bin count of a plurality of frequency bins associated with the FFT capture that are greater than a predetermined decibel threshold based, at least in part, on the RSSI data associated with the FFT capture;
      compare the bin count of the frequency bins that are greater than the predetermined decibel threshold to a predetermined bin count threshold to determine whether the FFT capture is a narrowband FFT capture; and
   wherein, in response to determining that the plurality of FFT captures are narrowband FFT captures, the classification unit is operable to determine a narrowband signal type associated with the RF signal received at the wireless network device based, at least in part, on a plurality of parameters associated with the narrowband FFT captures.

13. The server system of claim 12, wherein,
for each FFT capture, the classification unit operable to determine the bin count comprises the classification unit operable to:
   determine whether the RSSI data associated with the FFT capture is greater than a predetermined RSSI threshold; and
   in response to determining that the RSSI data is greater than the predetermined RSSI threshold, determine the bin count of the plurality of frequency bins associated with the FFT capture that are greater than the predetermined decibel threshold; and
the classification unit operable to compare the bin count comprises the classification unit operable to:
   in response to determining that the bin count is less than the predetermined bin count threshold, classify the FFT capture as a narrowband FFT capture;
   in response to determining that the bin count is greater than the predetermined bin count threshold, classify the FFT capture as a wideband FFT capture.

14. The server system of claim 12, wherein, in response to determining the plurality of FFT captures are narrowband FFT captures, the classification unit is operable to:
   detect a plurality of narrowband bursts associated with the plurality of narrowband FFT captures; and
   determine a narrowband signal type associated with the RF signal received at the wireless network device based, at least in part, on a plurality of parameters associated with the plurality of narrowband bursts associated with the plurality of narrowband FFT captures.

15. The server system of claim 14, wherein, in response to determining the narrowband signal type, the classification unit is operable to cause the server system to provide classification data indicating the narrowband signal type to the wireless network device.

16. The server system of claim 15, wherein, in response to determining the narrowband signal type, the classification unit is further operable to cause the server system to provide an indication of one or more recommended channels to the wireless network device to avoid an interference signal associated with the narrowband signal type.

17. The server system of claim 12, wherein the wireless network device comprises a wireless local area network (WLAN) client device or a WLAN access point.

18. A method comprising:
    receiving a plurality of Fast Fourier Transform (FFT) captures at a server system of a communication network from a wireless network device, wherein the plurality of FFT captures comprise time-frequency data and receive signal strength indicator (RSSI) data associated with an RF signal received at the wireless network device;
    for each FFT capture,
        determining a bin count of a plurality of frequency bins associated with the FFT capture that are greater than a predetermined decibel threshold, based, at least in part, on the RSSI data associated with the FFT capture;
        comparing the bin count of the frequency bins that are greater than the redetermined decibel threshold to a predetermined bin count threshold to determine whether the FFT capture is a narrowband FFT capture; and
    in response to determining that the plurality of FFT captures are narrowband FFT captures, determining a narrowband signal type associated with the RF signal received at the wireless network device based, at least in part, on a plurality of parameters associated with the narrowband FFT captures.

19. The method of claim 18, wherein, for each FFT capture, said determining the bin count comprises:
    determining whether the RSSI data associated with the FFT capture is greater than a predetermined RSSI threshold; and
    in response to determining that the RSSI data is greater than the predetermined RSSI threshold, determining the bin count of the plurality of frequency bins associated with the FFT capture that are greater than the predetermined decibel threshold; and
said comparing the bin count further comprises:
    in response to determining that the bin count is less than the predetermined bin count threshold, classifying the FFT capture as a narrowband FFT capture; and
    in response to determining that the bin count is greater than the predetermined bin count threshold, classifying the FFT capture as a wideband FFT capture.

20. The method of claim 18, wherein, in response to determining the plurality of FFT captures are narrowband FFT captures, the method further comprises:
    detecting a plurality of narrowband bursts associated with the plurality of narrowband FFT captures; and
    determining a narrowband signal type associated with the RF signal received at the wireless network device based, at least in part, on a plurality of parameters associated with the plurality of narrowband bursts associated with the plurality of narrowband FFT captures.

21. The method of claim 18, wherein, in response to determining the narrowband signal type, providing classification data indicating the narrowband signal type from the server system to the wireless network device.

22. The method of claim 18, wherein the wireless network device comprises a wireless local area network (WLAN) client device or a WLAN access point.

* * * * *